(12) United States Patent  (10) Patent No.: US 8,828,301 B2
Furey et al.  (45) Date of Patent: Sep. 9, 2014

(54) IN-MOLD LABELING SYSTEMS WITH POLYMERIC LABEL RECEPTOR AND IN-MOLD LABELING METHODS THEREWITH

(75) Inventors: Thomas Furey, Bellbrook, OH (US); Robert Freund, Centerville, OH (US)

(73) Assignee: The Standard Register Company, Dayton, OH (US)

( * ) Notice: Subject to any disclaimer, the term of this patent is extended or adjusted under 35 U.S.C. 154(b) by 338 days.

(21) Appl. No.: 13/275,637

(22) Filed: Oct. 18, 2011

(65) Prior Publication Data

US 2013/0093125 A1 Apr. 18, 2013

(51) Int. Cl.
*B29C 33/14* (2006.01)
*B29C 41/20* (2006.01)
*B29C 49/24* (2006.01)
*B29C 45/14* (2006.01)
*B29C 33/12* (2006.01)
*B29C 49/36* (2006.01)

(52) U.S. Cl.
CPC . B29C 45/14065 (2013.01); *B29C 2045/14918* (2013.01); *B29C 2045/14114* (2013.01); *B29C 49/36* (2013.01); *B29C 49/2408* (2013.01); B29C 41/20 (2013.01); B29C 33/12 (2013.01); *B29C 2049/2474* (2013.01)
USPC ................. 264/338; 249/83; 249/94; 249/96; 249/102; 249/114.1

(58) Field of Classification Search
CPC ........ B29C 33/14; B29C 33/56; B29C 41/20; B29C 2045/14065; B29C 2045/14139; B29C 2049/2017; B29C 2049/2412; B29C 2049/2464
USPC .............. 249/83, 94, 96, 102, 114.1; 264/338
See application file for complete search history.

(56) References Cited

U.S. PATENT DOCUMENTS

| 3,108,850 | A | * | 10/1963 | Brandt | 264/509 |
| 3,207,822 | A | * | 9/1965 | Makowski | 264/509 |
| 3,292,209 | A | * | 12/1966 | Borkmann | 425/126.1 |
| 4,025,686 | A | * | 5/1977 | Zion | 442/373 |
| 5,498,307 | A | * | 3/1996 | Stevenson | 156/277 |
| 2009/0162620 | A1 | * | 6/2009 | Swabey et al. | 428/195.1 |
| 2010/0291329 | A1 | * | 11/2010 | Di Duca | 428/35.2 |

* cited by examiner

Primary Examiner — Robert B Davis
(74) Attorney, Agent, or Firm — Dinsmore & Shohl LLP

(57) ABSTRACT

An in-mold labeling system includes a molding apparatus having a first mold half and a second mold half that opposes the first mold half, the mold halves defining at least one mold cavity contained within a cavity wall. The in-mold labeling system further comprises a polymeric label receptor fixed to at least a portion of the cavity wall of the at least one mold cavity. The polymeric label receptor has a tacky contact face facing the inside of the at least one mold cavity when the molding apparatus is in the closed position. During a molding process, the tacky contact face of the polymeric label receptor receives a mold-side face of a label. The label is held in position against the tacky contact face during the molding process by surface tension between the mold-side face of the label and the tacky contact face of the polymeric label receptor.

20 Claims, 10 Drawing Sheets

IN-MOLD LABELING SYSTEMS WITH POLYMERIC LABEL RECEPTOR AND IN-MOLD LABELING METHODS THEREWITH

TECHNICAL FIELD

The present invention relates generally to molding apparatus for in-mold labeling of molded articles and, more particularly, to components that facilitate stabilization of labels within in-mold labeling apparatus during a molding process, and to labeling methods using in-mold labeling apparatus with the components.

BACKGROUND

In-mold labeling is a technique, whereby a label is applied to a molded part during the molding of the part. During a typical in-mold labeling process, a label is inserted into a molding cavity of a molding apparatus, the molding cavity is closed, and molding material is introduced into the closed molding cavity as a melt. When the molding cavity is reopened at an appropriate stage, an in-mold labeled article is ejected from the molding cavity and is decorated with the label. The label itself generally is made of a material having a composition compatible to the material of the molded article.

Successful production of in-mold labeled articles requires that the label be held in a proper location within the mold cavity from when the label is introduced until the molding material solidifies, including the times during which the mold cavity is closed and during which the molding material is introduced into the closed molding cavity. Moreover, to facilitate part ejection and to ensure integrity of the label, the label should not stick to the walls of the molding cavity once the molded part has solidified.

Conventional in-mold labeling apparatus may include mechanical means to hold labels in their proper position. For example, a vacuum system can be integrated into a labeling apparatus such that, through small holes in the mold cavity, a label can be held in place by suction. Such a vacuum system requires capital costs and maintenance costs. Alternatively, an electrostatic generator can be integrated into the labeling apparatus and configured to charge the mold cavity. The charged mold cavity holds the labels in place by electrostatic pinning. Like the vacuum system, the electrostatic generator adds capital costs and maintenance costs. Moreover, the usefulness of electrostatic systems may be limited by charge dissipation during a molding cycle or by incompatibilities with certain specialty labels or metallic labels that cannot hold an electrostatic charge.

Conventional in-mold labeling processes also may involve one or more functional coatings on either the label or the molding apparatus. The functional coatings may include adhesives or antistatic layer, for example and may be incorporated into a molding system as alternatives to, or in addition to, mechanical holding means in the labeling apparatus. For example, the label or the mold-cavity surface may be coated with an appropriate adhesive that holds the label to the mold cavity during molding but debonds from the mold cavity in time for the molded part to be ejected. Methods involving such functional coatings or adhesives, therefore, require a cumbersome and costly step of applying the coating and also require choosing a coating compatible with the label material.

There remain ongoing needs for in-mold labeling systems and in-mold labeling methods having dependable and reproducible features that ensure stabile placement of labels during a molding process.

SUMMARY

The view of the above background, embodiments described herein are directed to versatile and cost-effective in-mold labeling systems that do not require electrostatic systems, vacuum systems, or specialized coating materials to hold labels in place during a molding process cycle. Further embodiments are directed to in-mold labeling methods incorporating the in-mold labeling system. Non-limiting embodiments of in-mold labeling systems include injection-molding systems and rotational-molding systems.

Embodiments of in-mold labeling systems may include a molding apparatus having a first mold half and a second mold half that opposes the first mold half, such that in a closed position of the molding apparatus the first mold half and the second mold half define at least one mold cavity contained within a cavity wall. The in-mold labeling systems may further include a polymeric label receptor fixed to at least a portion of the cavity wall of the at least one mold cavity. The polymeric label receptor has a tacky contact face facing the inside of the at least one mold cavity when the molding apparatus is in the closed position. During a molding process, the tacky contact face of the polymeric label receptor receives a mold-side face of a label, and the label is held in position against the tacky contact face during the molding process by surface tension between the mold-side face of the label and the tacky contact face of the polymeric label receptor.

Embodiments of in-mold labeling methods may include using an in-mold labeling system, as described above, to perform a series of steps. First, a label may be placed onto the polymeric label receptor so that a mold-side face of the label directly contacts the tacky contact face of the polymeric label receptor and the label is held in position against the tacky contact face by surface tension between the mold-side face of the label and the tacky contact face of the polymeric label receptor. Then, the first mold half and the second mold half may be moved together to place the molding apparatus in the closed position. A molding material may be contacted to an article-side face of the label while the molding apparatus is in the closed position. After an article is formed, the first mold half and the second mold half may be moved apart to place the molding apparatus in an open position. Finally, an in-mold labeled article having the label attached thereto may be removed from the molding apparatus.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

DETAILED DESCRIPTION

Figure 1A:
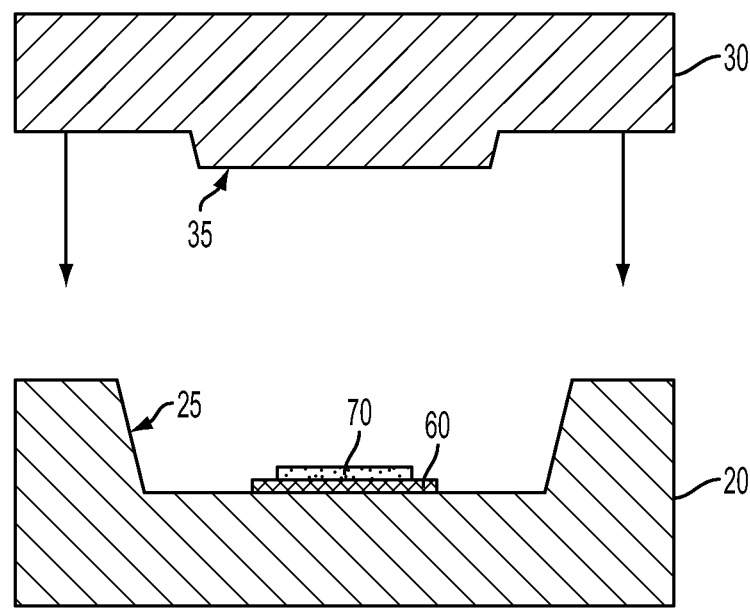
FIG. 1A is a plan view of open mold halves, which may be incorporated into in-mold labeling systems according to embodiments described herein, including a polymeric label receptor fixed to a surface of a mold half, and a label disposed on the polymeric label receptor.
Figure 1B:
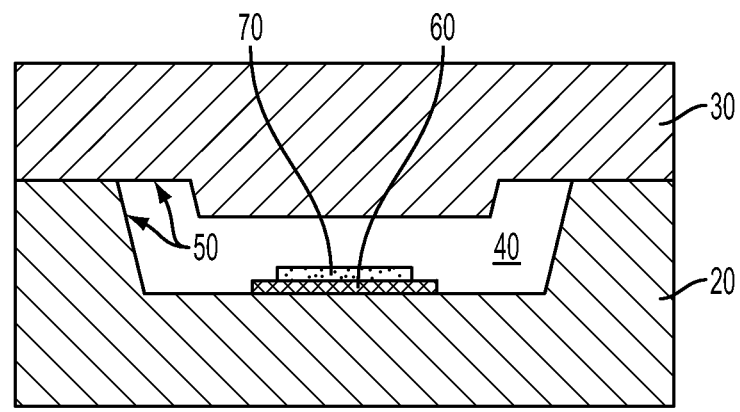
FIG. 1B shows the mold halves of FIG. 1A after closed, so as to define at least one mold cavity between the two mold halves.

Multiple embodiments of in-mold labeling systems will be described. Each embodiment of an in-mold labeling system includes at least the common features illustrated in FIGS. 1A and 1B, without limitation to specific configurations or geometries of any of the features. In FIGS. 1A and 1B, a first mold half 20 and a second mold half 30 are shown. The second mold half 30 opposes the first mold half 20. The first mold half 20 and the second mold half 30 may be made from any material used in the molding arts to form molds, particularly materials capable of withstanding heat cycles with maximum temperatures of up to 700° C., and also particularly materials that do not react with a molding material such as plastic or rubber. For example, the first mold half 20 and the second mold half 30 may be made of a metal such as aluminum, steel, or stainless steel.

A first surface 25 of the first mold half 20, and a second surface 35 of the second mold half 30, each comprises surface features configured such that, when the first mold half 20 and the second mold half 30 are brought together, the surface features on the opposing mold halves align so as to form at least one mold cavity 40 between the mold halves, as depicted in FIG. 1B. The shape of the at least one mold cavity 40 determines the shape of an in-mold labeled article that can be produced using a molding apparatus including the first mold half 20 and the second mold half 30. The portions of both the first surface 25 of the first mold half 20 and the second surface 35 of the second mold half 30 that define or enclose the at least one mold cavity 40 together compose a cavity wall 50 of the at least one mold cavity 40. Thus, the at least one mold cavity 40 may be described as being contained within or surrounded by the cavity wall 50. It should be understood that the shape of the at least one mold cavity 40 in FIGS. 1A and 1B is intended only to be illustrative, not as limiting of any embodiment to any particular shape or configuration.

As shown in FIGS. 1A and 1B, a polymeric label receptor 60 is fixed to at least a portion the first surface 25 of the first mold half 20 and, as such, is fixed to at least a portion of the cavity wall 50 of the at least one mold cavity 40 when the first mold half 20 and the second mold half 30 are brought together as shown in FIG. 1B. As used herein with regard to the polymeric label receptor 60, the term "fixed to" means the polymeric label receptor 60 has a set location with respect to the portion of the at least one mold cavity 40, whether physically contacting the at least one mold cavity 40 or attached to the at least one mold cavity 40 by an heat-resistant adhesive.

As will be described below in greater detail, the polymeric label receptor 60 supports a label 70 thereon. Regardless of the type of in-mold labeling system in which the polymeric label receptor 60 is incorporated, the label 70 is held in place against the polymeric label receptor 60 by surface tension between the label 70 and the polymeric label receptor 60 during a molding process performed using the in-mold labeling system. Moreover, the label 70 may held in place against the polymeric label receptor 60 by such surface tension even when the in-mold labeling system does not include vacuum or electrostatic apparatus specifically intended to hold labels in place. It should be apparent that FIGS. 1A and 1B are not drawn to scale. In particular, and as described through further non-limiting embodiments in greater detail below, the polymeric label receptor 60 may be a layer having a thickness of from about 1 mil (about 25.4 μm) to about 100 mil (about 2.54 mm) and the label 70 may have a thickness ranging from about 5 mil (about 0.13 mm) to about 25 mil (about 0.64 mm), whereas the size of the at least one mold cavity 40 is limited only to the desired size of a molded object to be manufactured.

In FIGS. 1A and 1B, the polymeric label receptor 60 is shown as fixed to a portion of the first surface 25 of the first mold half 20 or to a portion of the cavity wall 50 that is disposed on first mold half 20. Nevertheless, it will be understood that the polymeric label receptor 60 may be attached to any suitable position on the second mold half 30. It is further contemplated that more than one polymeric label receptor may be attached to the cavity wall 50, such that one or more individual polymeric label receptors may present on the first mold half 20 only, on the second mold half 30 only, or on both the first mold half 20 and the second mold half 30, as desired. In general, the polymeric label receptor 60 may be present anywhere along the contour of the cavity wall 50 where the article being produced by the molding process is intended to have a label.

Illustrative embodiments of in-mold labeling systems incorporating the above-mentioned features now will be described. The illustrative embodiments include an injection-molding system, described with reference to FIGS. 2-3, and a rotational-molding system, described with reference to FIGS. 4-6. The particular illustrative embodiments are not intended to be limiting, however, as it should be apparent that the features described above with reference to FIGS. 1A and 1B may be incorporated in any molding system known or used in the art of manufacturing in-mold labeled articles such as, for example, alternative configurations of injection-molding apparatus known or to be discovered but not explicitly shown herein, alternative configurations of rotational-molding apparatus known or to be discovered but not explicitly shown herein, and any suitable configuration of blow-molding apparatus known or to be discovered. Generally, the molding apparatus used with in-mold labeling systems according to embodiments described herein may be interchanged with any type of molding apparatus that is suitable for molding plastics, polymers, or rubbers.

Figure 2:
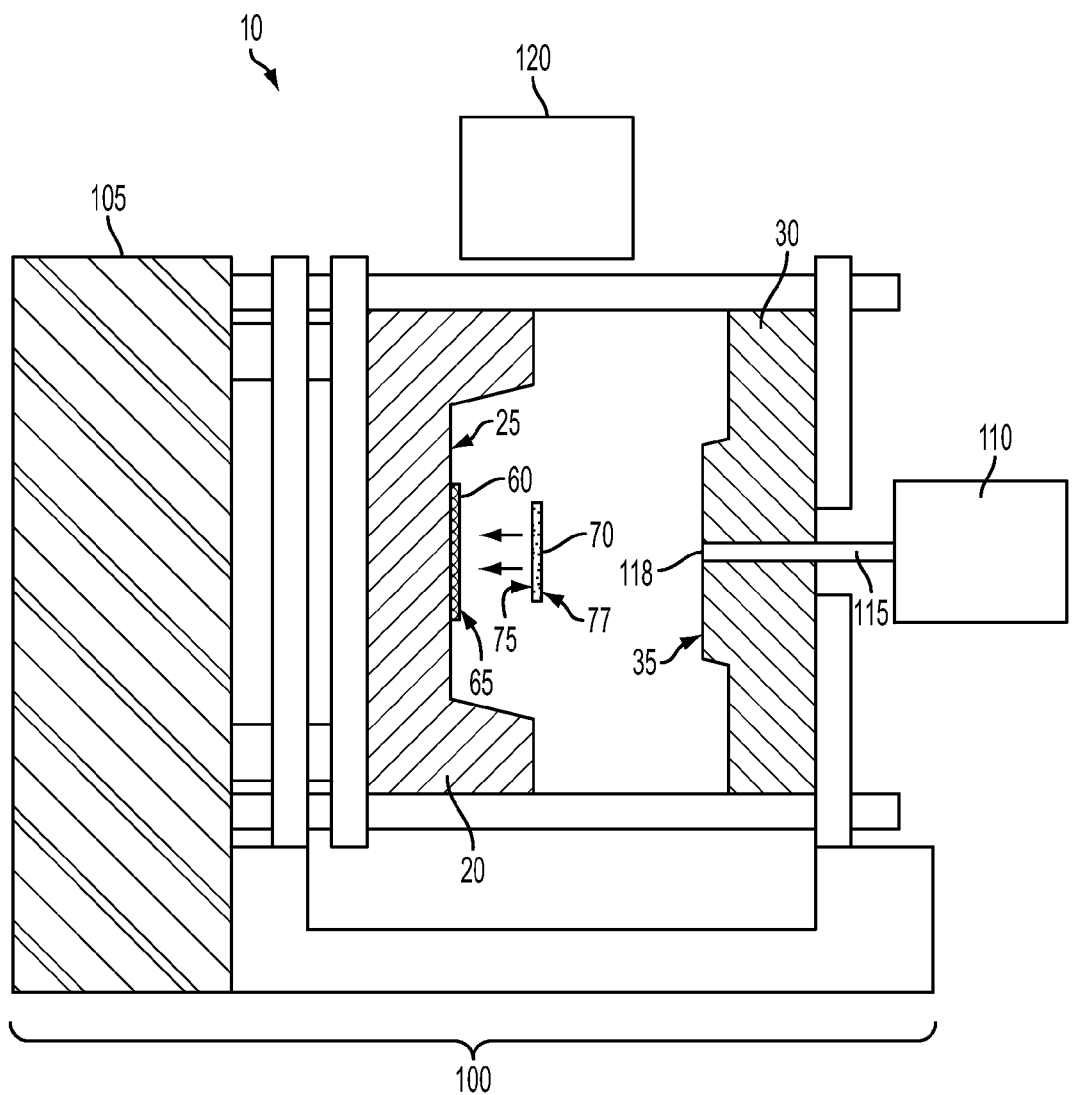
FIG. 2 illustrates components of an in-mold labeling system, according to embodiments described herein, with an injection-molding apparatus being shown in an open position.
Figure 3:
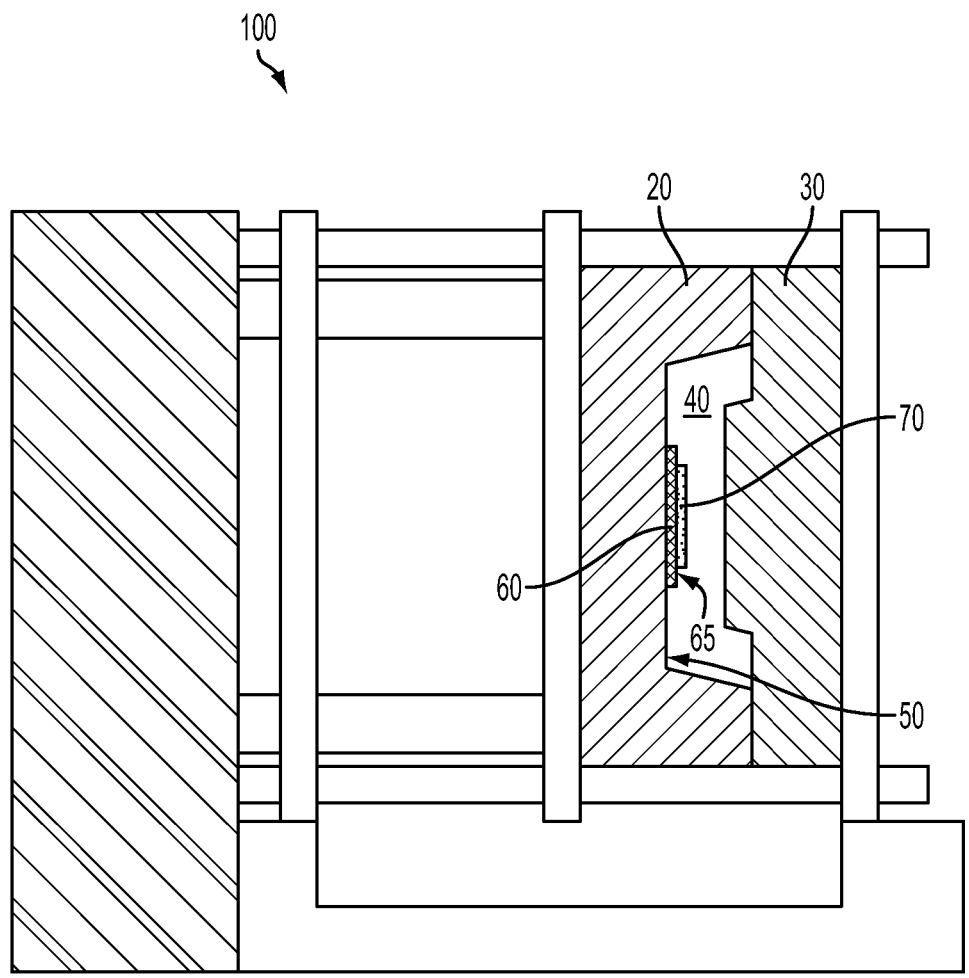
FIG. 3 further illustrates components of the in-mold labeling system, according to embodiments described herein, with the injection-molding apparatus of FIG. 2 being shown in a closed position.

Referring to FIGS. 2 and 3, an in-mold labeling system 10 is shown that includes an injection-molding apparatus 100 having a first mold half 20 and a second mold half 30 that opposes said first mold half 20. The first mold half 20 and the second mold half 30 may be made from any suitable material commonly used to form molds in injection molding. For example, the first mold half 20 and the second mold half 30 may be made of a metal such as aluminum, steel, or stainless steel. As shown in FIGS. 2 and 3 for illustrative purposes only, the first mold half 20 and the second mold half 30 may be movable by means of a hydraulic press 105. It should be understood, however, that the injection-molding apparatus 100 itself and its mechanism for moving the first mold half 20 and the second mold half 30 toward and away from each other may take any number of forms known in the art, and that the hydraulic press 105 for moving the mold halves shown in FIGS. 2 and 3 is not meant to be limiting.

In an illustrative injection molding process using the injection molding apparatus 100, molten material may provided to at least one mold cavity by means of a delivery system. As an illustration only, for this purpose, the injection-molding apparatus 100 in FIG. 2 is shown with an optional delivery system 110 having a material conduit 115 through which molding material may be introduced from the optional delivery system 110 into a molding cavity through a mold gate 118. The optional delivery system 110 may comprise a hydraulic screw (not shown), for example.

As depicted in the injection-molding apparatus 100 of FIG. 3, the first surface 25 of the first mold half 20, and a second surface 35 of the second mold half 30, each comprise surface features configured such that, when the first mold half 20 and the second mold half 30 are brought together, the surface features on the opposing mold halves align and form the at least one mold cavity 40 between the mold halves. The shape of the at least one mold cavity 40 determines the shape of an in-mold labeled article that can be produced from the injection-molding apparatus 100. The portions of both the first surface 25 of the first mold half 20 and the second surface 35 of the second mold half 30 that define or enclose the at least one mold cavity 40 together compose a cavity wall 50 of the at least one mold cavity 40. Thus, the at least one mold cavity 40 may be described as being contained within or surrounded by the cavity wall 50. It should be understood that the shape of the at least one mold cavity 40 in FIG. 3 is intended only to exemplify the structural components of the injection-molding apparatus 100, not to limit the injection-molding apparatus 100, as further described and claimed herein, to any particular shape or configuration.

With regard to the positions of the first mold half 20 and the second mold half 30 during stages of an injection-molding process, the injection-molding apparatus 100 may be described as having both an open position and a closed position. The closed position, shown in FIG. 3, describes when the first mold half 20 is pressed against the second mold half 30, so as to define or enclose the at least one mold cavity 40 between the first mold half 20 and the second mold half 30. As used herein, the term "open position" encompasses all positions of the first mold half 20 and the second mold half 30 relative to each other, except the closed position. As such, the open position encompasses all degrees of openness of the injection-molding apparatus 100, including a barely-open position (not shown) at which the mold halves are only a few millimeters apart, label-insertion positions (not shown) at which the mold halves are optimally spaced so as to permit inserting a label, an ejection position (not shown) at which a molded part can be ejected or removed from a cavity, and a full-open position (as shown in FIG. 2), representing the mechanical limit of the injection-molding apparatus 100 for separating the mold halves.

In contrast to injection-molding apparatus, in blow molding apparatus and rotational molding apparatus, typically the molding material is introduced as a solid parison or straw and the mold halves are closed around the solid parison or straw. Thus, blow molding apparatus and rotational molding apparatus do not necessarily require any particular delivery system for molding material. In blow molding, a gas such as air is blown through the straw, and the straw expands outward toward the cavity walls of the mold to create a hollow object having the contour of the cavity wall. In rotational molding, the closed mold halves are rotated such that molding material is drawn outwardly against the cavity wall by centrifugal forces. The amount of molding material introduced, and the speed at which the mold halves are rotated, determine the thickness of the walls of a hollow object formed in the rotational mold. To illustrate these differences from an injection-molding apparatus, one embodiment of a rotational-molding apparatus now will be described.

Figure 4:
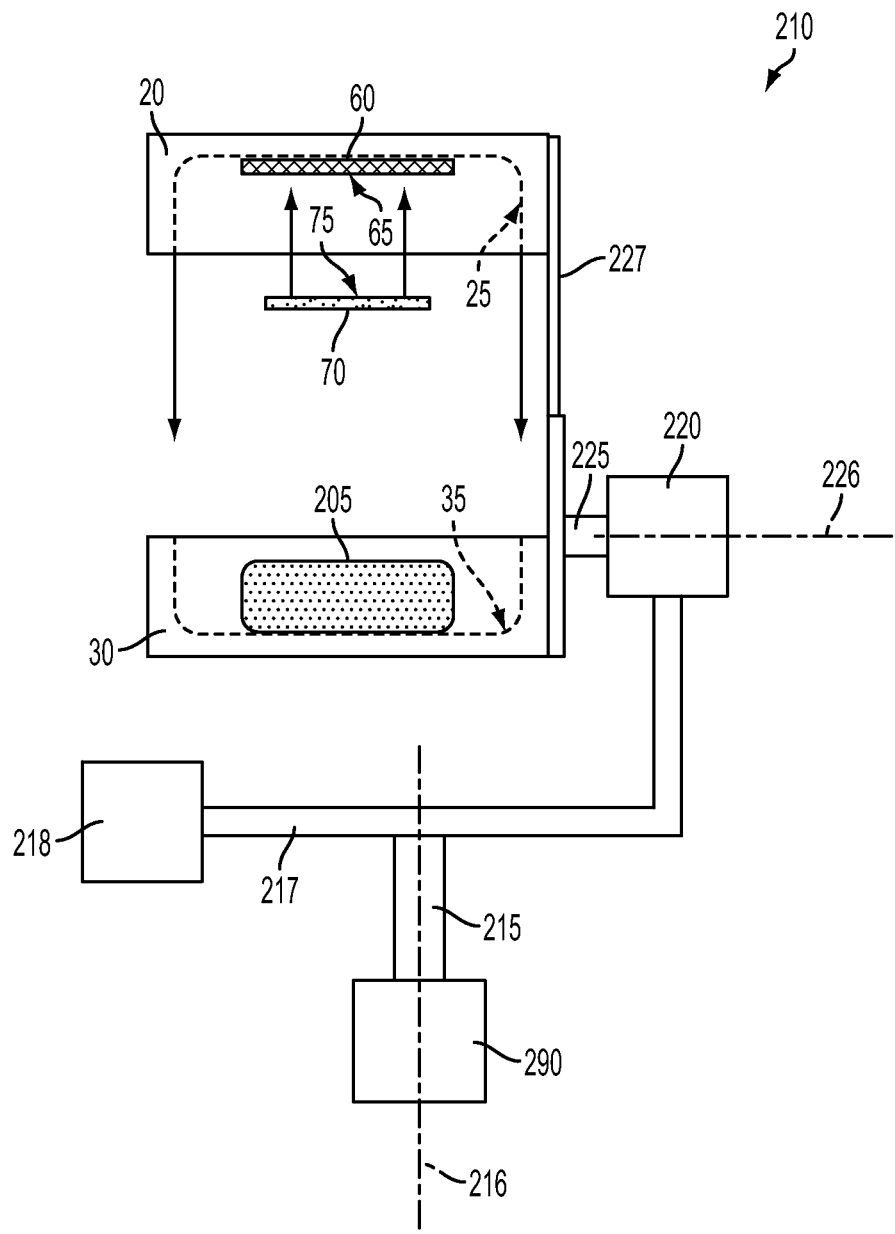
FIG. 4 is a rotomold including a polymeric label receptor, according to embodiments described herein, in an open position.
Figure 5:
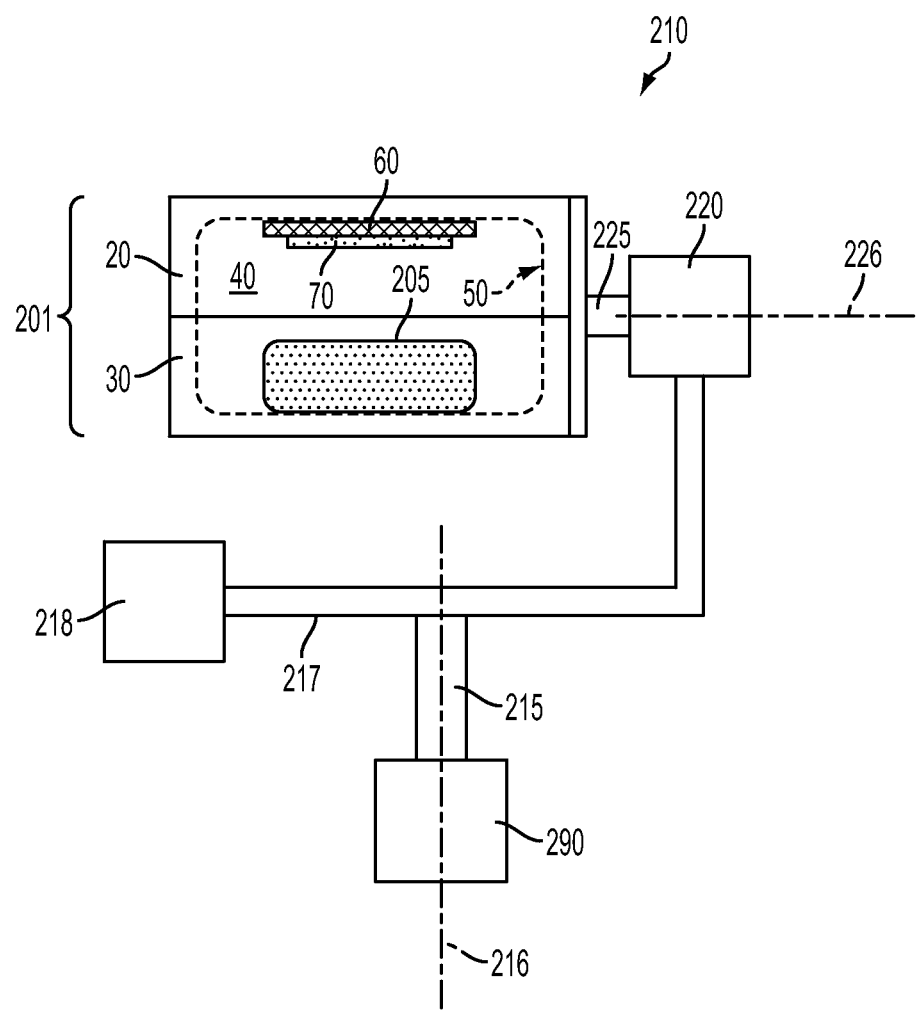
FIG. 5 is the rotomold of FIG. 4, in a closed position.

Referring to FIGS. 4 and 5, a non-limiting illustrative configuration of mold halves of a rotational-molding apparatus is shown. In particular, FIG. 4 illustrates a rotomold 210 in an open position, and FIG. 4 illustrates the rotomold 210 in a closed position. The rotomold 210 forms part of a rotational-molding apparatus 200 to be further described below with reference to FIG. 6. The rotomold 210 includes a first mold half 20 and a second mold half 30 that opposes said first mold half 20. The first mold half 20 and the second mold half 30 may be made from any suitable material commonly used to form molds in rotational molding. For example, the first mold half 20 and the second mold half 30 may be made of a metal such as aluminum, steel, or stainless steel. As shown in FIG. 4 for illustrative purposes only, the first mold half 20 and the second mold half 30 may be movable by closing arm 227, for example In the rotomold 210 of FIGS. 4 and 5, the first surface 25 of the first mold half 20, and a second surface 35 of the second mold half 30, each comprise surface features configured such that, when the first mold half 20 and the second mold half 30 are brought together as in FIG. 5, the surface features on the opposing mold halves align and form the at least one mold cavity 40 between the mold halves. The shape of the at least one mold cavity 40 determines the shape of a molded article that can be produced from a rotational-molding apparatus incorporating the rotomold 210. The portions of both the first surface 25 of the first mold half 20 and the second surface 35 of the second mold half 30 that define or enclose the at least one mold cavity 40 together compose a cavity wall 50 of the at least one mold cavity 40. Thus, the at least one mold cavity 40 may be described as being contained within or surrounded by the cavity wall 50. It should be understood that the shape of the at least one mold cavity 40 in FIG. 5 is intended only to exemplify the structural components of the rotomold 210, not to limit the rotomold 210 to any particular shape or configuration.

Molding material may be introduced into the rotomold 210, for example, in the form of a parison 205. The parison 205 may be placed in solid form into the rotomold 210 at the beginning of a molding cycle, when the rotomold 210 is in its open position, as in FIG. 4. Also before the beginning of a molding cycle, a label 70 may be placed onto a polymeric label receptor 60, described in further detail below. The label 70 may be placed onto the polymeric label receptor 60 manually (i.e., by hand manipulation) Thereupon, the rotomold 210 may be closed, as shown in FIG. 5, by moving together the first mold half 20 and the second mold half 30. When the rotomold 210 is closed, the first mold half 20 and the second mold half 30 together compose a molding barrel 201 having therein the at least one mold cavity 40, in which are disposed the parison 205, the polymeric label receptor 60, and the label 70.

The rotomold 210 may further comprise a primary rotator mechanism 220 that rotates a primary axle 225 and the molding barrel 201 about primary rotational axis 226. The rotomold 210 may comprise still further a transverse rotator mechanism 290 that rotates each of a transverse axle 215, a transverse support bar 217, a counterweight 218, and the molding barrel 201 about a transverse rotational axis 216. The primary rotator mechanism 220 and the transverse rotator mechanism 290 may be any machine or mechanism capable of rotational motion. Preferably, but not necessarily, the primary rotational axis 226 and the transverse rotational axis 216 are perpendicular to each other. In some embodiments, the primary rotational axis 226 and the transverse rotational axis 216 are perpendicular to each other and also intersect where the center of gravity of the molded article being formed will be located. The counterweight 218 may be any suitable structure that ensures a constant center of gravity during the rotational molding cycle, thereby preventing wobbling of the molding apparatus.

Figure 6:
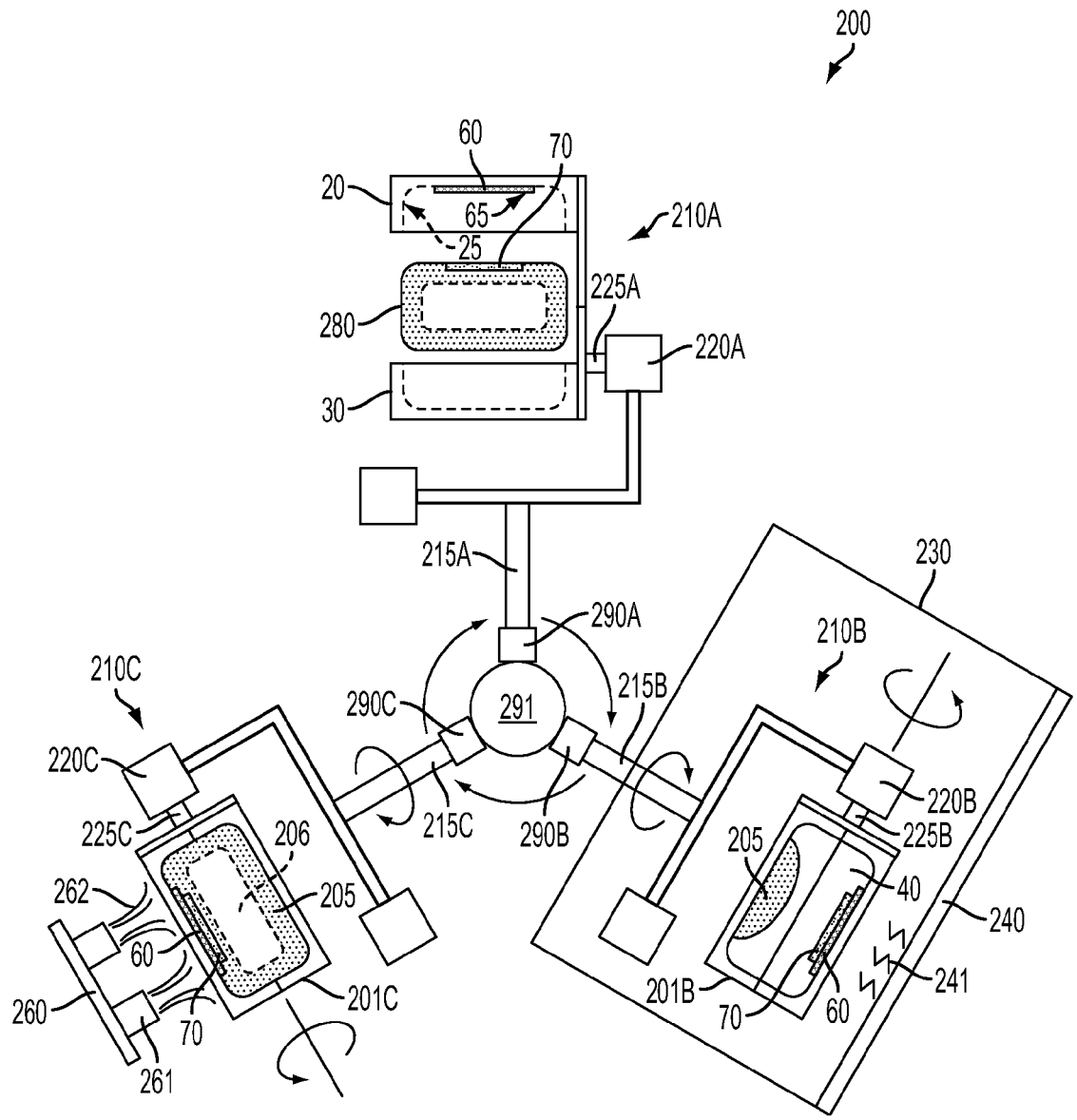
FIG. 6 illustrates components of an in-mold labeling system, particularly a rotational-molding apparatus, according to embodiments described herein.

An illustration of a rotational molding cycle is provided through the visual schematic diagram of FIG. 6, wherein a rotational-molding apparatus 200 is shown as having three rotomolds: a first rotomold 210A, a second rotomold 210B, and a third rotomold 210C, each connected to a main rotator mechanism 291 that rotates each of the first rotomold 210A, the second rotomold 210B, and the third rotomold 210C as illustrated by arrows circumscribing the main rotator mechanism 291, generally about an axis perpendicular to both the primary rotational axis 226 (see FIGS. 4 and 5) and the transverse rotational axis 216 (see FIGS. 4 and 5) of each rotomold. The first rotomold 210A includes a first mold half 20, a second mold half 30, a first primary axle 225A rotatable by a first primary rotator mechanism 220A, and a first transverse axle 215A rotatable by a first transverse rotator mechanism 290A. The second rotomold 210B includes a second molding barrel 201B, a second transverse axle 215B rotatable by a second primary axle 225B rotatable by a second primary rotator mechanism 220B, and a second transverse rotator mechanism 290B. The third rotomold 210C includes a third molding barrel 201C, a third primary axle 225C rotatable by a third primary rotator mechanism 220C, and a third transverse axle 215C rotatable by a third transverse rotator mechanism 290C. It should be understood that the rotational-molding apparatus 200 in FIG. 6 is presented as a schematic representation of concepts and process steps common to any rotational molding operation, not as limiting in any regard to a particular configuration of rotational molding components or mechanisms, except insofar as each apparatus includes a polymeric label receptor 60.

An illustrative rotational molding cycle may occur, for example, in four stages: (1) loading; (2) heating while rotating; (3) cooling while rotating; and (4) unloading. In the rotational-molding apparatus 200 of FIG. 6, the loading and unloading stages occur at the same position, namely, at the position of the first rotomold 210A. In FIG. 6, the first rotomold 210A is shown during the final unloading stage, which will be further described below. The loading stage has been described already with reference to rotomold 210 in FIGS. 4 and 5, wherein the rotomold 210 may be loaded with a parison 205, a label 70 may be placed on the polymeric label receptor 60, and the rotomold 210 may be closed by moving the first mold half 20 and the second mold half 30 together.

In FIG. 6, the stage of heating while rotating is illustrated for the second rotomold 210B. The particular embodiment of the rotational-molding apparatus 200 shown in FIG. 6 includes a heating chamber 230 with a heating element 240 that provides thermal radiation 241 to the second molding barrel 201B of the second rotomold 210B. The second rotomold 210B may be disposed within the heating chamber 230. It should be understood that the second rotomold 210B need not necessarily be enclosed within the heating chamber 230 and that the heating element 240 may be provided in any number of configurations not limited to the single-wall configuration shown in FIG. 6. In alternative embodiments not shown, the second molding barrel 201B may have a built-in heater, for example, that raises the temperature of the at least one mold cavity 40 to a temperature at which the parison 205 begins to melt or flow.

While the second molding barrel 201B is heated by the heating element 240, for example, the second molding barrel 201B may be rotated by one or both of the second primary rotator mechanism 220B and the second transverse rotator mechanism 290B. If the second molding barrel 201B is rotated by both the second primary rotator mechanism 220B and the second transverse rotator mechanism 290B, the rotations may be simultaneous, sequential, or in any desired alternating manner. The rotations both may be conducted at a predetermined number of revolutions per minute, based on the weight of the parison 205, for example. The heating while rotating stage may be conducted for a predetermined time at a predetermined temperature, depending on the weight of the parison 205 and the type of material used as the parison 205. The predetermined temperature may be from about 100° C. to about 700° C., for example, and the predetermined time may be from about 10 minutes to about 2 days, for example. Optimization of the rotational speeds, temperatures, and cycle times may be carried out according to methods well known and understood by those skilled in the art of rotational molding.

The combination of the heating of the at least one mold cavity 40, such as by the heating element 240, with the centrifugal forces resulting from the rotations of one or both of the second primary rotator mechanism 220B and the second transverse rotator mechanism 290B causes the parison 205 to melt or become viscous and to spread to the outsides of the at least one mold cavity 40 and contact the label 70. At the end of the heating while rotating stage of the rotational molding cycle, the parison 205 generally will cover the label 70 and will conform to the outer walls of the at least one mold cavity 40. The thickness of the material conforming to the outer walls of the at least one molding cavity depends on the initial size of the parison 205. Typically, an initial size of the parison 205 is chosen such that a hollow space will remain in the middle of the at least one mold cavity 40 when all of the material from the parison 205 is drawn to the outer walls of the at least one mold cavity 40. Once an equilibrium is reached, whereby the parison 205 has spread to its fullest extent, the heating while rotating stage may end, and the cooling while rotating stage may commence.

In FIG. 6, the third rotomold 210C is shown in the cooling while rotating stage of the rotational molding cycle. The parison 205 inside the third molding barrel 201C has been drawn to the outer walls of the molding cavity, leaving a hollow space 206 in the center. The parison 205 covers the label 70 on the polymeric label receptor 60. A cooling apparatus 260 includes cooling jets 261 that direct a coolant 262 such as water or chilled air, for example, toward the third molding barrel 201C. The cooling jets 261 may be activated while the third molding barrel 201C is rotated by one or both of the third primary rotator mechanism 220C and the third transverse rotator mechanism 290C. If the third molding barrel 201C is rotated by both the third primary rotator mechanism 220C and the third transverse rotator mechanism 290C, the rotations may be simultaneous, sequential, or in any desired alternating manner. The rotations both may be conducted at a predetermined number of revolutions per minute, based on the weight of the parison 205, the temperature during the cooling, and the desired rate of cooling, for example. The cooling while rotating stage may be conducted for a predetermined time with a predetermined coolant temperature, depending on the temperature the parison 205 when the cooling begins, the melting point of the parison 205, and also the desired rate of cooling, for example. The predetermined coolant temperature may be from about −50° C. to about 100° C., typically from about 0° C. to about 50° C., for example, and the predetermined time may be from about 30 second to about 5 hours, for example. Optimization of the rotational speeds, temperatures, and cycle times may be carried out according to methods well known and understood by those skilled in the art of rotational molding.

The combination of the cooling of the at least one mold cavity 40 with the centrifugal forces resulting from the rotations of one or both of the third primary rotator mechanism 220C and the third transverse rotator mechanism 290C prevents the parison 205 from contracting back into the hollow space 206, particularly while the parison 205 remains close to its melting point at the beginning of the cooling stage. At the end of the cooling while rotating stage of the rotational molding cycle, the temperature of the parison 205 will be well below the melting point of the parison 205, and the parison 205 itself typically will be solid.

In FIG. 6, the first rotomold 210A is shown in the final stage of the rotational molding cycle, the unloading or ejection stage. During the unloading stage, the first rotomold 210A is opened by separating the first mold half 20 from the second mold half. An in-mold labeled article 280 is then removed from the first rotomold 210A by any suitable method, with or without a special tool. When the in-mold labeled article 280 is removed, the label 70 is permanently attached to the in-mold labeled article 280, with or without an intervening adhesive, preferably without an intervening adhesive. When no intervening adhesive is present, the label 70 may be permanently fused into a surface of the in-mold labeled article 280. The polymeric label receptor 60 remains fixed to the first surface 25 of the first mold half 20. Notably, the tacky contact face 65 of the polymeric label receptor 60, which initially served to hold the label 70 in place by surface friction during all other stages of the rotational molding cycle, does not bond to the label 70, damage the label 70, or otherwise hinder the removal of the in-mold labeled article 280 with the label 70 thereon.

Between stages of the rotational molding cycle, the main rotator mechanism 291 may rotate the first rotomold 210A, the second rotomold 210B, and the third rotomold 210C so that the first rotomold 210A moves into the position previously occupied by the second rotomold 210B, the second rotomold moves into the position previously occupied by the third rotomold 210C, and the third rotomold 210C moves into the position previously occupied by the first rotomold 210A. Again, it should be understood that the rotational-molding apparatus 200 shown in FIG. 6 is meant to illustrate a molding cycle schematically, without limitation to any specific structure or configuration of the apparatus itself. It should be understood that the rotational molding apparatus may have as few as one rotomold, or any desirable number of rotomolds such as two, four, ten, or more than ten, for example.

A detailed description of the polymeric label receptor 60, present in both the injection-molding apparatus 100 illustrated in FIGS. 2 and 3 and the rotational-molding apparatus 200 shown in FIGS. 4-6, now will be provided. In general for any molding apparatus, and as illustrated in both the injection-molding apparatus 100 and the rotational-molding apparatus 200, the polymeric label receptor 60 is fixed to at least a portion of the cavity wall 50 of the at least one mold cavity 40. As used herein with regard to the polymeric label receptor 60, the term "fixed to" means the polymeric label receptor 60 has a set location with respect to the portion of the at least one mold cavity 40.

Figure 7:
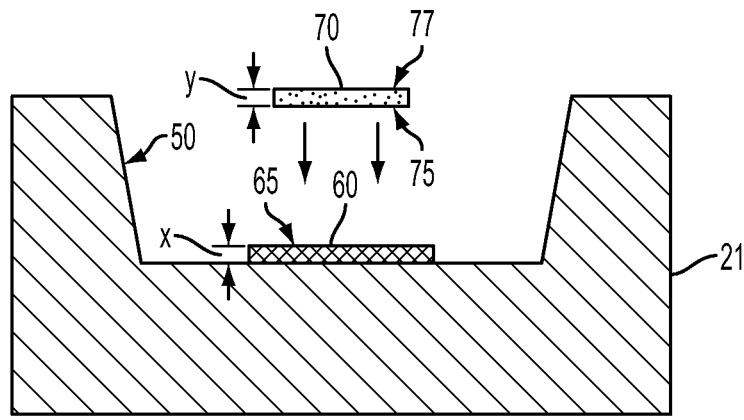
FIG. 7 shows an embodiment of a mold half having a polymeric label receptor attached directly to a surface of the mold half.

Exemplary configurations of the polymeric label receptor 60 on a cavity wall 50 of a mold half 21 are shown in FIGS. 7-13. In each of FIGS. 7-13, the mold half 21 may represent a first mold half (e.g., first mold half 20 in FIGS. 1A and 1B), a second mold half (e.g., second mold half 30 in FIGS. 1A and 1B), or both, with the understanding that the cavity wall 50 in any mold cavity is simply the portions of the surfaces of the first mold half and the second mold half that face the inside of the mold cavity. As shown in FIG. 7, the polymeric label receptor 60 may be fixed to the cavity wall 50 via a direct physical attachment of the polymeric label receptor 60 to the cavity wall 50. In some embodiments, the polymeric label receptor 60 may be glued to the cavity wall 50. In other embodiments, the polymeric label receptor 60 may be cured or vulcanized directly onto the cavity wall 50.

Figure 8:
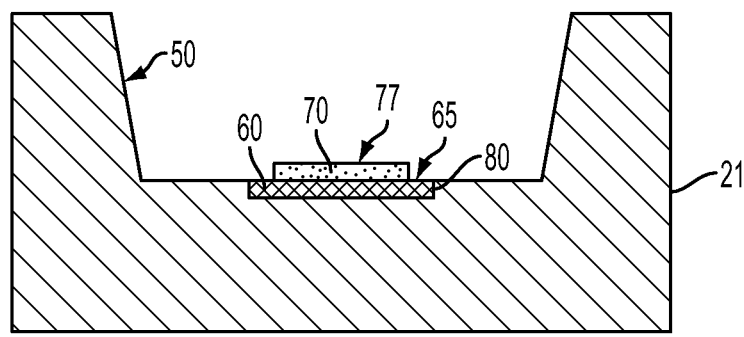
FIG. 8 shows an embodiment of a mold half having an indentation that accommodates a polymeric label receptor, such that the polymeric label receptor is attached directly to the surface of the mold half within the indentation.
Figure 9:
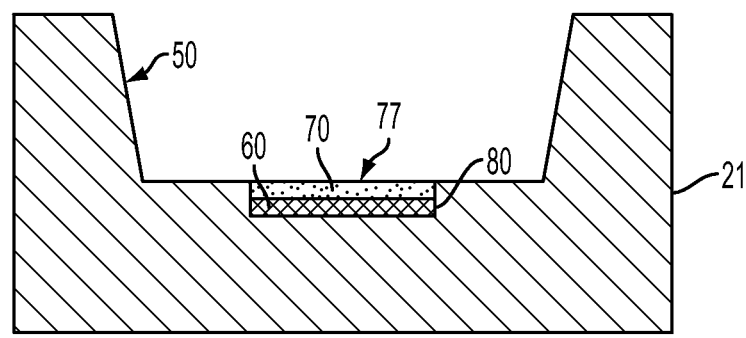
FIG. 9 shows an embodiment of a mold half having an indentation that accommodates both a polymeric label receptor and a label, such that the polymeric label receptor is attached directly to the surface of the mold half within the indentation, and such that the article-side face of the label is flush with the face of the mold half outside the indentation.

In further embodiments shown in FIGS. 8 and 9, the cavity wall 50 may comprise a countersink feature 80, and the polymeric label receptor 60 may be glued to a portion of the cavity wall 50 within the countersink feature 80 or may be cured directly onto a portion of the cavity wall 50 within the countersink feature 80. In the embodiment shown in FIG. 10, the polymeric label receptor 60 may cover a substantial portion, or even all, of the cavity wall 50 of the mold half 21. In the embodiment shown in FIG. 11, one or more polymeric label receptors may be fixed to respective portions of the cavity wall 50 such as, for example, a first polymeric label receptor 60A fixed to a flat portion of the cavity wall 50, a second polymeric label receptor 60B fixed to a convex portion of the cavity wall 50, and a third polymeric label receptor 60C fixed to a concave portion of the cavity wall.

In alternative embodiments exemplified in FIGS. 12A, 12B, and 13, and described in greater detail below, the polymeric label receptor 60 may be fixed to the cavity wall 50, according to the definition of "fixed" herein, while being only indirectly attached to the cavity wall 50. For example, the polymeric label receptor 60 may be glued to or cured or vulcanized onto a removable insert 90, and the removable insert 90 may be mechanically fastened to the cavity wall 50. In such embodiments, the cavity wall 50 may comprise a countersink feature 80 into which the removable insert 90 can be placed and subsequently fastened to the cavity wall 50. In all respects, when the polymeric label receptor 60 is glued to or cured or vulcanized onto the removable insert 90 and the removable insert 90 is fastened into the countersink feature 80 in the cavity wall 50, the location of the polymeric label receptor 60 remains fixed with respect to the portion of the at least one mold cavity 40.

Referring to FIGS. 1A, 1B, 2-5, and 7, the polymeric label receptor 60 has a tacky contact face 65 that faces the inside of the at least one mold cavity 40 when the molding apparatus (e.g., injection-molding apparatus 100 or rotational-molding apparatus 200) is in its closed position. As illustrated in FIGS. 2, 4, and 7, during a molding process, the tacky contact face 65 of the polymeric label receptor 60 receives a mold-side face 75 of a label 70. Molding material introduced into the at least one mold cavity 40 during a molding process will flow against an article-side face 77 of the label 70. Thereby, on a labeled article produced by the molding process (e.g., in-mold labeled article 280 in FIG. 6, produced by rotational molding), the article-side face 77 adheres to or is permanently fused into a surface of the labeled article, and the mold-side face 75 of the label 70 is exposed. As exemplary embodiments, FIGS. 4, and 7 both illustrate respective molding apparatus in the open position and exemplify how the label 70 is placed onto the tacky contact face 65 of the polymeric label receptor 60.

Referring to FIGS. 2-5, the label 70 is held in position against the tacky contact face 65 during any molding process by surface tension between the mold-side face 75 of the label 70 and the tacky contact face 65 of the polymeric label receptor 60. The surface tension alone suffices to hold the label 70 in its position, thereby lessening or eliminating any need for costly vacuum systems, electrostatic systems, or additional functional or adhesive coatings applied to either the label 70 or the cavity wall 50. Thus, whether molding material is introduced into the at least one mold cavity 40 in the form of molten material through the mold gate 118 (see FIG. 2) for injection molding, in the form of a parison 205 (see FIG. 4) for rotational molding, or in the form of a straw (not shown) for blow molding the label 70 remains at the proper position with respect to the cavity wall 50 when the molding material is present in the at least one mold cavity 40.

In exemplary embodiments, the polymeric label receptor 60 is a polymeric material having physical characteristics chosen so as to enable the tacky contact face 65 of the polymeric label receptor 60 to hold a label 70 in position during a molding cycle without the use of adhesives, vacuum, or electrostatic pinning. The polymeric material preferably is soft and pliable, with a Shore D hardness of 20 or less, or from about 10 to about 20, for example. Additionally, the polymeric material may be sufficiently firm so as not to be susceptible to developing dents or occlusions on the tacky contact face 65 of the polymeric label receptor 60. The polymeric material may be chosen from materials able to withstand multiple repeated molding cycles, at least 25,000, for example, and repeated temperature cycling from room temperature to about 700° F. (370° C.). Suitable polymeric materials in this regard include, without limitation: silicone rubbers, room-temperature vulcanizing rubbers, Krayton rubbers, polyurethanes, and polyacrylates. In preferred embodiments, the polymeric label receptor 60 is a silicone rubber or a room-temperature vulcanizable (RTV) silicone rubber. For example, the polymeric label receptor 60 may be a vulcanizable polydimethylsiloxane (PDMS) rubber that remains pliable in temperatures from 0° C. to 400° C. but does not melt below 400° C.

Preferably, the material of the polymeric label receptor 60 is chosen such that a precursor to the material can be spread onto a metal surface and be vulcanized directly to the metal surface. The polymeric label receptor 60 may be fixed to the cavity wall 50 by any method capable of adhering the polymer material to the cavity wall 50 (typically a metal such as aluminum or steel) such that the polymeric label receptor 60 does not detach, debond, or delaminate from the cavity wall 50 during or after repeated molding cycles. For example, the polymeric label receptor 60 may be shaped or cut from a piece of polymeric material and then bonded directly to the cavity wall 50 by means of an appropriate thermally-stable adhesive capable of withstanding temperatures up to about 700° F. (370° C.).

Alternatively, the polymeric label receptor 60 may be cured directly onto the cavity wall 50, according to the following exemplary procedure. A portion of the cavity wall 50 first may be prepared by cleaning then roughening the metal surface of the cavity wall 50. The metal surface may be roughened may be accomplished by any suitable abrasion method such as by sanding or sandblasting, for example. Unvulcanized silicone rubber may be spread evenly onto the roughened surface of the cavity wall 50. The spreading may be accomplished by any suitable method such as by painting of liquid unvulcanized silicone rubber with a brush or roller or by calendaring of sheets of a semi-solid or viscous unvulcanized silicone rubber against the cavity wall 50. In some embodiments, a sufficient amount of polymeric material may be applied so as to yield a layer of unvulcanized silicone rubber that is from 5 mil to 100 mil (0.127 mm to 2.54 mm), preferably from 5 mil to 20 mil (0.127 mm to 0.508 mm), more preferably from about 10 mil to about 20 mil (0.254 mm to 0.508 mm), more preferably from about 10 mil to about 15 mil (0.254 mm to 0.381 mm). To cure or vulcanize the polymeric material, localized or generalized heat may be applied to the uncured or unvulcanized polymeric material. For example, a heat gun may be used to heat the polymeric material to at least 200° F. (93° C.) for at least 5 minutes. The heating thereby causes the polymeric material to cure directly into the metal of the cavity wall 50.

Optionally, before the unvulcanized silicone rubber is spread onto the roughened surface, a thin layer (typically less than 100 μm) of a primer may be spread onto the roughened surface, so that the unvulcanized silicone rubber may be spread onto the thin layer of primer. The primer may be a crosslinking catalyst, such as a platinum-based catalyst, that initiates crosslinking of the unvulcanized silicone rubber when heat or UV radiation is applied. Once the unvulcanized silicone rubber is applied, vulcanization may be initiated, for example, by heating the silicone rubber with a heat gun to a curing temperature such as 200° C. for 1 to 5 minutes, for example, or by exposing the silicone rubber to ultraviolet light.

Optionally, before the vulcanization, a layer of a smooth polyester or polyethylene film may be laid on top of the unvulcanized silicone rubber. When such a layer is applied before the vulcanization, the silicone rubber underneath the layer obtains the smooth surface of the layer. Then, once the silicone rubber is fully vulcanized, the layer of polyester or polyethylene may be removed by simply peeling the layer off the vulcanized silicone rubber. The resulting tacky contact surface of the vulcanized silicone rubber will form a very smooth surface or even a glossy surface. It is believed that very smooth or glossy surfaces formed in this manner may produce labeled articles without surface defects on the labels.

Without intent to be limited by theory, it is believed that the silicone rubber, during vulcanization, may wet into microscopic surface features of the roughened metal surface. This wetting is believed to cause the resulting vulcanized silicone rubber to adhere optimally well to the metal surface of the mold half, whereby the polymeric label receptor not only remains intact after thousands of molding cycles having large temperature and pressure fluctuations but also can be removed only by severe treatments such as by sandblasting.

Optionally, a thermal transfer agent such as barium ferrite, for example, may be incorporated into the polymeric material before curing or vulcanization to enhance heat transfer through the polymeric label receptor. When the thermal transfer agent is present, the polymeric material of the polymeric label receptor may comprise from 0.1% by weight to 20% by weight, or from 0.1% by weight to 10% by weight, or from 0.5% by weight to 5% by weight, of the thermal transfer agent, based on the weight of the polymeric material.

The polymeric label receptor 60 may have any desired shape and, preferably, may have the shape of the label 70 to be adhered to the molded article being formed during the molding process. For example, the polymeric label receptor 60 may be a rectangle having sides of equal length to the sides of a rectangular label being applied. As a further example, the label 70 may comprise curves or irregular bends, and the polymeric label receptor 60 may comprise corresponding curves or bends so that the shape of the label 70 matches the shape of the polymeric label receptor 60. The polymeric label receptor 60 may be the same size and may have the same shape as the label 70 or may be larger than the label 70. Preferably, the polymeric label receptor 60 is not smaller than the label 70, to ensure that that no portion of the label 70 directly contacts the cavity wall 50 during the molding process.

The tacky contact face 65 of the polymeric label receptor 60 preferably is a glossy surface, particularly a glossy surface having a higher surface coefficient of friction than that of the cavity wall 50. The glossy surface may be generally devoid of any visually perceptible pits or unevenness. The tacky contact face 65 may be tacky to the touch, even when no additional adhesives or coatings are present on the tacky contact face 65. A glossy surface for the tacky contact face 65 is especially preferred when the mold-side face 75 of the label 70 itself is glossy. The tacky contact face 65 may be cleaned with water or alcohol to remove contaminants such as dust or oils.

The tackiness of the tacky contact face 65 may be exemplified by an ability to hold the label 70 in place against the force of gravity when the tacky contact face 65 is oriented downward. The tackiness of the tacky contact face 65 may be exemplified further in that the label 70 does not move when a horizontal force of up to 10 N, such as from 1 N to 10 N or from 1 N to 5 N, or from 0.5 N to 3 N, is applied to the label 70 in the plane of the label 70. In this regard, both the surface coefficient of friction and the tackiness of the tacky contact face 65 may result in resistance to horizontal displacement of the label 70 thereon. Without intent to be bound by theory, it is believed that the contacting of two glossy surfaces, particularly those of the tacky contact face 65 of the polymeric label receptor 60 and the mold-side face 75 of the label, may create a weak vacuum between the polymeric label receptor 60 and the label 70, such that the weak vacuum effectively increases the surface tension between the polymeric label receptor 60 and the label 70. In turn, the surface tension alone may suffice to hold the label 70 in one position during the molding process. Because only the surface tension holds the label 70 against the polymeric label receptor 60, when a labeled article (e.g., in-mold labeled article 280 of FIG. 6) is produced using an in-mold labeling system having the polymeric label receptor 60, the labeled article may be easily ejected from the molding apparatus without risk of damaging the label 70 in instances common in apparatus without the polymeric label receptor, such as when the label 70 adheres to the cavity wall 50.

FIGS. 7-11 illustrate five non-limiting embodiments of configurations for the placement of the polymeric label receptor 60 relative to the cavity wall 50. In the example configuration shown in FIG. 7, for example, the polymeric label receptor 60 is fixed to or, for example, directly adhered to or cured or vulcanized onto, the cavity wall 50 of the mold half 21. As shown in FIG. 7, the polymeric label receptor 60 may have a receptor thickness x, which may be from 5 mil to 100 mil (0.127 mm to 2.54 mm), preferably from 5 mil to 20 mil (0.127 mm to 0.508 mm), more preferably from about 10 mil to about 20 mil (0.254 mm to 0.508 mm), more preferably from about 10 mil to about 15 mil (0.254 mm to 0.381 mm). The receptor thickness x in FIG. 7 represents a height of the tacky contact face 65 of the polymeric label receptor 60 above the cavity wall 50. The tacky contact face 65 of the polymeric label receptor faces toward where the inside of the at least one mold cavity will be in a molding apparatus incorporating the mold half 21. The label 70 may be placed on the polymeric label receptor 60, such that a mold-side face 75 of the label 70 directly contacts the tacky contact face 65 of the polymeric label receptor 60.

The label 70 itself has a label thickness y that may vary, depending on the application and material chosen. Typical, but non-limiting, values for label thickness y may range from as thin as 5 mil (0.127 mm) to as thick as 25 mil (0.635 mm). When the label 70 is placed on the polymeric label receptor 60, an article-side face 77 of the label faces the same direction as the tacky contact face 65. On a labeled article (not shown), the article-side face 77 will be adhered to or permanently fused into a surface of the labeled article. To note, in the configuration of FIG. 7, the surface of the labeled article will comprise a depression approximately as deep as the receptor thickness x, and the label 70 will be disposed in the depression.

In the embodiment of FIG. 8, the cavity wall 50 comprises a countersink feature 80 having a depth equal to the thickness of the polymeric label receptor 60. The polymeric label receptor 60 is directly fixed to (i.e., adhered to or cured onto) the cavity wall 50 of the mold half 20, so as to completely fill the countersink feature 80 and be flush with the cavity wall 50. As such, the surface of a labeled article produced from the configuration of FIG. 8 will not include a depression, in contrast with the labeled article produced from the configuration in FIG. 7. Rather, the labeled article will have a smooth surface that transitions from the molded material to the label 70 and back to the molded material without a noticeable vertical bump.

In the embodiment of FIG. 9, the cavity wall 50 comprises a countersink feature 80 having a depth equal to the combined thickness of the polymeric label receptor 60 and the label 70. The polymeric label receptor 60 is fixed to (i.e., directly adhered to or cured onto) the cavity wall 50 of the mold half 21, so as to fill only a portion of the countersink feature 80, such that when the label 70 is inserted, the article-side face 77 of the label is flush with the cavity wall 50.

As such, the surface of a labeled article produced from the configuration of FIG. 9 will comprise a raised surface where the label is present. It is further contemplated in an embodiment not shown that the countersink feature 80 may be configured to have a depth greater than the combined thickness of the polymeric label receptor 60 and the label 70. Thereby, the label 70 will be disposed on a raised surface of the labeled article produced from such a configuration.

Figure 10:
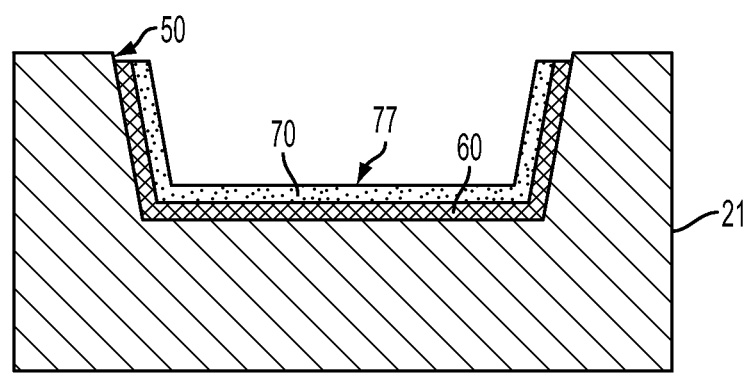
FIG. 10 shows an embodiment of a mold half including a polymeric label receptor covering nearly all of the cavity wall of the mold half.

In the embodiment of FIG. 10, polymeric label receptor 60 covers nearly all of the cavity wall 50 of the mold half 21. The label 70 may be bent or folded according to the contour of the polymeric label receptor 60 so that the article-side face 77 of the label 70 will conform to the desired surface contour of the molded article being formed. This embodiment may be appropriate for forming labeled articles in which nearly all of a surface of the labeled article is intended to be covered by the label 70. It is further contemplated that a polymeric label receptor covering all or nearly all of the cavity wall 50 of the mold half 21 may function further as a protective layer for the mold half 21. In particular, when molding materials such as polyvinyl chloride (PVC) are used in molding processes, the molding materials may outgas corrosive hydrogen chloride, which may damage or pit the mold half 21.

Figure 11:
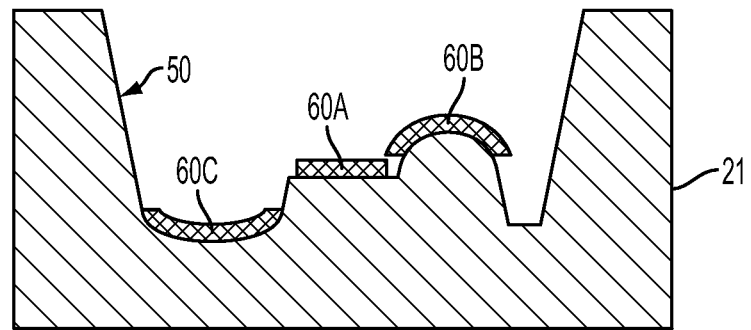
FIG. 11 shows additional examples of polymeric label receptors attached to surfaces of a mold half having various curved profiles.

In the embodiment of FIG. 11, multiple polymeric label receptors are fixed to the cavity wall 50 of the mold half 21. First polymeric label receptor 60A is fixed to a flat portion of the cavity wall 50, second polymeric label receptor 60B is fixed to a convex portion of the cavity wall 50, and third polymeric label receptor 60C is fixed to a concave portion of the cavity wall 50. Thus, the embodiment of FIG. 11 illustrates how the positioning of the polymeric label receptors is not limited to only flat portions. Analogous to the configuration shown and described in FIG. 7, molded articles labeled using the mold half 21 in FIG. 11 will not include a depression, in contrast with labeled articles produced from the configuration in FIG. 6A (analogous to FIG. 3). Rather, the labeled article will have a smooth surface that transitions from the molded material to each of the three applied labeled and back to the molded material without interruption.

In configurations wherein the polymeric label receptor 60 is directly adhered to or cured onto the cavity wall 50, the polymeric label receptor 60 may continue to be used during repeated molding process runs until the polymeric label receptor 60 wears out or acquires undesirable surface imperfections. Thereupon, the polymeric label receptor 60 may be removed from the cavity wall 50 through physical or chemical effort including, for example, scraping, sandblasting, etching, or chemical debonding of any adhesive (if an adhesive was used). Once the depleted polymeric label receptor has been removed, a new polymeric label receptor may be applied to the cavity wall 50.

Figure 12A:
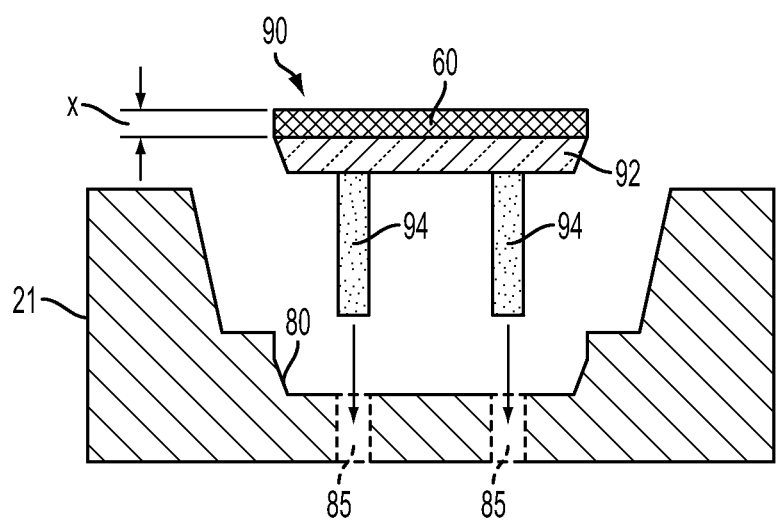
FIG. 12A shows an embodiment of a mold half having an indentation that accommodates a removable insert, the removable insert having a polymeric label receptor attached to a top surface of a base portion of the removable insert.
Figure 12B:
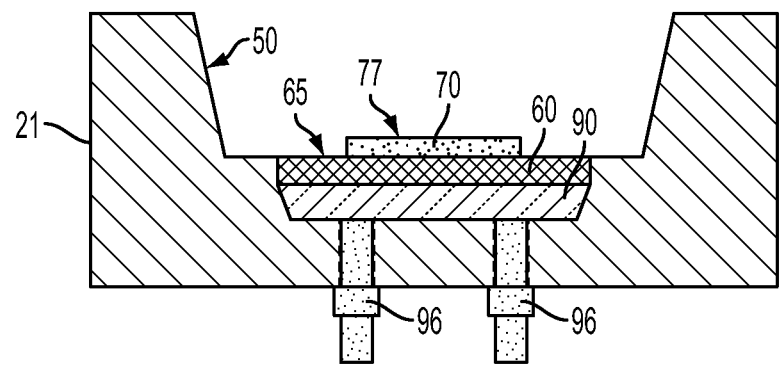
FIG. 12B shows the removable insert from FIG. 12A seated within the mold half, such that the polymeric label receptor is flush with the surface of the mold half outside the indentation of the mold half.
Figure 13:
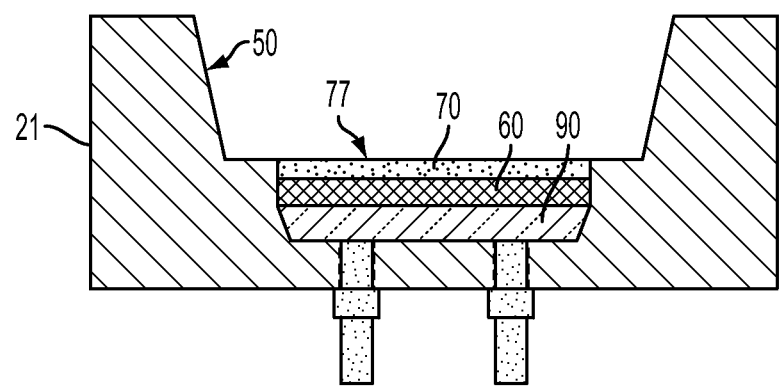
FIG. 13 shows an embodiment of a removable insert seated in an indentation of a mold half, the removable insert having a polymeric label receptor attached to a top surface of a base portion of the removable insert, the polymeric label receptor having a thickness such that, when a label is placed on the polymeric label receptor, the article-side face of the label is flush with the surface of the mold half outside the indentation of the mold half.

In alternative embodiments, labor and downtime associated with removing depleted polymeric label receptors may be mitigated substantially through the modular systems depicted in FIGS. 12A, 12B, and 13. As shown in FIG. 12A, for example, the polymeric label receptor 60 may be adhered to or cured or vulcanized directly onto a base section 92 of a removable insert 90. The base section 92 may comprise any rigid material capable of withstanding the typical temperatures and pressures of the molding process. Preferably, the base section 92 is a metal such as aluminum or steel and may be machined, for example, from the same material as that of the first mold half 20 so as to avoid thermal aberrations owing to differences in thermal coefficients of expansion. The removable insert 90 may comprise at least one insertion pin 94 (two are shown, but more or fewer could be used). The cavity wall 50 may comprise a countersink feature 80 configured to accommodate the base section 92 and, optionally, the entirety of the polymeric label receptor 60 (as shown in FIG. 12B). The cavity wall 50 may further comprise at least one attachment hole 85, each of the at least one attachment hole 85 corresponding in location to exactly one of the at least one insertion pin 94, thereby enabling mechanical attachment of the removable insert 90 to the first mold half 20. In FIG. 12B, the removable insert 90 is shown to be mechanically attached to the first mold half 20 by means of locknuts 96. In the configuration shown in FIGS. 12A and 12B, the tacky contact face 65 of the polymeric label receptor 60 is flush with the cavity wall 50. An alternative configuration is shown in FIG. 13, whereby the article-side face 77 of the label is flush with the cavity wall 50.

Embodiments including the removable insert 90, of which FIGS. 12A, 12B, and 13 are provided only as very basic examples, may result in cost savings and ease of replacement. For example, when the polymeric label receptor 60 is found no longer to be suitable for use, the removable insert 90 may be simply unattached, pulled out, and replaced with an equivalent removable insert. Furthermore, the removable insert 90 may eliminate any need to repeatedly subject the cavity wall 50 to abrasive or chemical removal treatments necessary to replace polymeric label receptors cured directly onto the cavity wall 50, thereby preventing the possibility of any associated damage that could result to the cavity wall 50.

The in-mold labeling systems comprising the polymeric label receptor 60, as described herein, are contemplated for use with any and all types of labels known to be suitable for in-mold application, including without limitation polymeric labels and metallic decorative labels. Optionally, the label 70 may be printed with indicia and may be overprinted with a protective polymeric layer such as a urethane acrylate, as described in Abrams et al., U.S. Pat. No. 6,544,634, incorporated herein by reference. Non-limiting examples of the known types of materials for use as labels suitable for in-mold labeling may include a particular class of are microporous sheets comprising a polymer matrix, an interconnecting network of pores, and, optionally, filler particles. In these materials, the matrix of the microporous sheet may comprise one or more substantially water-insoluble thermoplastic organic polymers. The label 70 may have any desired purpose on the labeled article being manufactured. In non-limiting illustrative embodiments, the label 70 may be decorative in nature, or may be informative by conveying messages or warnings through indicia, or may be functional such as for providing a mirrored surface to an article, or may be an integral part of an article such as an interface panel for electrical buttons for an appliance.

Classes of suitable substantially water-insoluble thermoplastic organic polymers of microporous sheets that may be used as the label 70 may include, for example, thermoplastic polyolefins, poly(halo-substituted olefins), polyesters, polyamides, polyurethanes, polyureas, poly(vinyl halides), poly(vinylidene halides), polystyrenes, poly(vinyl esters), polycarbonates, polyethers, polysulfides, polyimides, polysilanes, polysiloxanes, polycaprolactones, polyacrylates, and polymethacrylates. Hybrid classes, for example, thermoplastic poly(urethane-ureas), poly(ester-amides), poly(silane-siloxanes), and poly(ether-esters) are within contemplation. Examples of specific substantially water-insoluble thermoplastic organic polymers include thermoplastic high density polyethylene, low density polyethylene, ultrahigh molecular weight polyethylene, polypropylene (atactic, isotactic, or syndiotactic), poly(vinyl chloride), polytetrafluoroethylene, copolymers of ethylene and acrylic acid, copolymers of ethylene and methacrylic acid, poly(vinylidene chloride), copolymers of vinylidene chloride and vinyl acetate, copolymers of vinylidene chloride and vinyl chloride, copolymers of ethylene and propylene, copolymers of ethylene and butene, poly(vinyl acetate), polystyrene, poly(omega-aminoundecanoic acid) poly(hexamethylene adipamide), poly(epsilon-caprolactam), and poly(methyl methacrylate).

The optional filler particles may be water-insoluble particulate fillers comprising siliceous and/or non-siliceous particles. The filler particles typically comprise from 30 wt. % or from 40 wt. % of the microporous material, to about 70 wt. % or to about 80 wt. %. A preferred particulate filler is finely divided substantially water-insoluble siliceous particles. Examples of suitable siliceous particles include particles of silica, mica, montmorillonite, kaolinite, asbestos, talc, diatomaceous earth (Kieselguhr), vermiculite, natural and synthetic zeolites, cement, calcium silicate, aluminum silicate, sodium aluminum silicate, aluminum polysilicate, alumina silica gels, and glass particles. Of the silicas, precipitated silica, silica gel, or fumed silica may be particularly suitable. Examples of non-siliceous filler particles include particles of titanium oxide, zinc oxide, antimony oxide, zirconia, magnesia, alumina, zinc sulfide, barium sulfate, strontium sulfate, calcium carbonate, magnesium carbonate, and magnesium hydroxide.

In one embodiment, a suitable label material for use in the in-mold labeling systems described herein is TESLIN®, registered trademark of PPG Industries, a microporous sheet comprising high molecular-weight polyethylene filled with precipitated silica particles. It is believed that microporous sheets of this kind, when having or provided with a glossy finish, may be held in position by surface tension alone against a preferably glossy surface of a polymeric label receptor made from silicone rubbers, room-temperature vulcanizable rubbers, polyurethanes, or polyacrylates, for example.

During a molding process involving the in-mold labeling systems described herein, the label 70 may be placed onto the tacky contact face 65 of the polymeric label receptor 60 by any practical mechanized or automated means, such as by a mechanical arm or robot, which may be controlled by a computer, for example. Alternatively, during in-mold labeling processes a label may be manually positioned in a mold cavity by the operator of the mold when the molding apparatus is in an open position. As applicable to the embodiments shown and described herein, in FIGS. 2, 4, and 7, for example, manual positioning of the label 70 on the polymeric label receptor 60 may involve simply aligning the label 70 with the polymeric label receptor 60, contacting the label 70 with the polymeric label receptor 60, and allowing the label 70 to cling to the polymeric label receptor 60 by surface tension. Optionally, the label 70 may be smoothed against the polymeric label receptor 60, for example, with a straight-edged tool, to prevent any creases or air bubbles in the label 70.

In additional embodiments, as shown in FIG. 2 for the injection-molding system 100, the in-mold labeling system optionally may further comprise an automated label supply system 120 that delivers the label 70 to the molding apparatus. Automated label supply systems are well known and may comprise components such as reel-to-reel dispenser for accommodating rolls of labels, cutting apparatus for separating labels from the rolls, and detection means such as cameras or sensors that track label alignment and registration. Alternatively, the automated label supply system 120 may include computer-controlled apparatus (not shown) such as a robot arm. When present, the automated label supply system 120 preferably is configured to align and place the mold-side face 75 of the label 70 onto the tacky contact face 65 of the polymeric label receptor 60.

Regardless of the molding system used such as injection molding, rotational molding, blow molding, or otherwise, once the label 70 has been placed on the polymeric label receptor 60 as described above, the molding apparatus may be moved into a closed position by bringing together the mold halves. A molding material is then contacted to the article-side face 77 of the label 70. In an injection-molding system, for example, the molding material contacts the article-side face 77 of the label when molding material is introduced into the at least one mold cavity 40 by pressure. In a rotational molding system, for example, the molding material contacts the article-side face 77 of the label when the parison 205 melts and flows to the outside of the at least one molding cavity 40. Once the molding material acquires the shape of the at least one molding cavity 40 and is allowed to cool sufficiently, the mold halves may be opened, and the in-mold labeled article, having the label 70 attached to it or fused into it, may be removed.

Thus, in-mold labeling systems and methods have been described, wherein a polymeric label receptor fixed to at least one of the mold halves in a molding apparatus is used to hold labels in place, without the need for costly apparatus such as vacuums, electrostatic charges, or specialized functional coatings to either the labels or the molding apparatus.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. One of ordinary skill in the art will understand that any numerical values inherently contain certain errors attributable to the measurement techniques used to ascertain the values.

It is noted that terms like "preferably," "commonly," and "typically" are not used herein to limit the scope of the claims or to imply that certain features are critical, essential, or even important to the structure or function of the claimed subject matter. Rather, these terms are intended merely to highlight alternative or additional features that may or may not be used in a particular embodiment.

For the purposes of describing and defining the present invention it is noted that the term "substantially" is used herein to represent the inherent degree of uncertainty that may be attributed to any quantitative comparison, value, measurement, or other representation. The term "substantially" is used herein also to represent the degree by which a quantitative representation may vary from a stated reference without resulting in a change in the basic function of the subject matter at issue. As such, it is used to represent the inherent degree of uncertainty that may be attributed to any quantitative comparison, value, measurement, or other representation, referring to an arrangement of elements or features that, while in theory would be expected to exhibit exact correspondence or behavior, may in practice embody something less than exact.

Though the invention has been described in detail and by reference to specific embodiments of the invention, it should be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects.

What is claimed is:

1. An in-mold labeling system comprising:
   a molding apparatus comprising a first mold half and a second mold half that opposes said first mold half, said molding apparatus having a closed position in which a first surface of said first mold half and a second surface of said second mold half together define at least one mold cavity contained within a cavity wall; and
   a polymeric label receptor fixed to at least a portion of said first surface or said second surface, said polymeric label receptor having a tacky contact face facing the inside of said at least one mold cavity when said molding apparatus is in said closed position,
   wherein said tacky contact face of said polymeric label receptor receives a mold-side face of a label during a molding process and said label is held in position against said tacky contact face during said molding process by surface tension between said mold-side face of said label and said tacky contact face of said polymeric label receptor, and wherein said polymeric label receptor is a cured or vulcanized layer selected from the group consisting of silicone elastomers, room-temperature vulcanizing silicone elastomers, polyurethanes, and polyacrylates.

2. The in-mold labeling system of claim 1, wherein said cured or vulcanized layer is cured or vulcanized directly on said cavity wall by coating a portion of said cavity wall with an uncured or unvulcanized material and subsequently curing or vulcanizing the uncured or unvulcanized material.

3. The in-mold labeling system of claim 1, wherein said cured or vulcanized layer is a silicone elastomer.

4. The in-mold labeling system of claim 1, wherein said cured or vulcanized layer is a room-temperature vulcanized silicone elastomer.

5. The in-mold labeling system of claim 1, wherein said cured or vulcanized layer has a melting point greater than 700° C.

6. The in-mold labeling system of claim 1, wherein the cavity wall of said at least one mold cavity has a countersink feature defined therein and said polymeric label receptor is disposed within said countersink feature.

7. The in-mold labeling system of claim 6, wherein said tacky contact face of said polymeric label receptor is flush with the cavity wall of said at least one mold cavity.

8. The in-mold labeling system of claim 1, wherein said tacky contact face of said polymeric label receptor has a Shore D hardness of from about 10 to about 20.

9. The in-mold labeling system of claim 1, wherein said tacky contact face of said polymeric label receptor is a glossy surface.

10. The in-mold labeling system of claim 1, wherein said tacky contact face of said polymeric label receptor has a higher surface coefficient of friction than said cavity wall.

11. The in-mold labeling system of claim 1, further comprising a removable insert mechanically fastened to the cavity wall of said at least one mold cavity, said removable insert comprising a base section, said polymeric label receptor being adhered to or cured directly onto said base section.

12. The in-mold labeling system of claim 11, wherein said polymeric label receptor is cured or vulcanized directly on said cavity wall by coating a portion of said cavity wall with an uncured or unvulcanized material and subsequently curing or vulcanizing the uncured or unvulcanized material.

13. The in-mold labeling system of claim 1, wherein said molding apparatus is selected from the group consisting of an injection molding apparatus, a blow molding apparatus, and a rotational molding apparatus.

14. The in-mold labeling system of claim 1, further comprising an automated label supply system that delivers said label to said molding apparatus in an open position of said molding apparatus, such that a mold-side face of said label directly contacts said tacky contact face of said polymeric label receptor.

15. A method for in-mold labeling using the in-mold labeling system of claim 1, said method comprising:
   placing a label onto said polymeric label receptor so that a mold-side face of said label directly contacts said tacky contact face of said polymeric label receptor and said label is held in position against said tacky contact face by surface tension between said mold-side face of said label and said tacky contact face of said polymeric label receptor;
   moving said first mold half and said second mold half together to place said molding apparatus in said closed position;
   contacting a molding material to an article-side face of said label while said molding apparatus is in said closed position;
   moving said first mold half and said second mold half apart to place said molding apparatus in an open position; and
   removing from said molding apparatus an in-mold labeled article having said label attached thereto.

16. The method of claim 15, wherein said cured or vulcanized layer is cured or vulcanized directly on said cavity wall by coating a portion of said cavity wall with an uncured or unvulcanized material and subsequently curing or vulcanizing the uncured or unvulcanized material.

17. The method of claim 15, wherein said tacky contact face of said polymeric label receptor has a Shore D hardness of from about 10 to about 20.

18. The method of claim 15, wherein said molding apparatus is selected from the group consisting of an injection molding apparatus, a blow molding apparatus, and a rotational molding apparatus.

19. The in-mold labeling system of claim 1, wherein said molding apparatus is a rotational molding apparatus.

20. The method of claim 15, wherein said molding apparatus is a rotational molding apparatus.

* * * * *